US009183103B2

(12) United States Patent
Cota-Robles

(10) Patent No.: US 9,183,103 B2
(45) Date of Patent: Nov. 10, 2015

(54) LIGHTWEIGHT REMOTE REPLICATION OF A LOCAL WRITE-BACK CACHE

(71) Applicant: VMware, Inc., Palo Alto, CA (US)

(72) Inventor: Erik Cota-Robles, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 236 days.

(21) Appl. No.: 13/907,341

(22) Filed: May 31, 2013

(65) Prior Publication Data

US 2014/0359229 A1    Dec. 4, 2014

(51) Int. Cl.
*G06F 11/20*    (2006.01)
*G06F 9/455*    (2006.01)
*G06F 11/00*    (2006.01)

(52) U.S. Cl.
CPC ............ *G06F 11/2056* (2013.01); *G06F 9/455* (2013.01); *G06F 9/45558* (2013.01); *G06F 11/00* (2013.01)

(58) Field of Classification Search
None
See application file for complete search history.

(56) References Cited

U.S. PATENT DOCUMENTS

| 5,754,754 | A | * | 5/1998 | Dudley et al. | ................... 714/18 |
| 8,819,362 | B1 | * | 8/2014 | Duprey et al. | ................ 711/162 |
| 2004/0177054 | A1 | * | 9/2004 | Stern et al. | ......................... 707/1 |
| 2014/0098822 | A1 | * | 4/2014 | Galles et al. | .................. 370/412 |

* cited by examiner

*Primary Examiner* — Daniel Tsui

(57) ABSTRACT

Techniques for replicating a write-back cache are provided. In one embodiment, a first computer system can receive a write request from a virtual machine (VM) that includes data to be written to a shared storage device. The first computer system can further save the data in a local cache device and transmit, via a network interface controller (NIC), a data packet including the data to a second computer system. Upon determining that the data packet has been transmitted via the NIC, the first computer system can communicate an acknowledgment to the VM indicating that the write request has been successfully processed.

18 Claims, 9 Drawing Sheets

LIGHTWEIGHT REMOTE REPLICATION OF A LOCAL WRITE-BACK CACHE

BACKGROUND

In data center environments, host-side flash caching (HFC) is becoming an increasingly popular technique for optimizing virtual machine (VM) access to data residing on shared storage. Generally speaking, an HFC-enabled host system caches, in a portion of a local flash storage device referred to as a "flash cache," data that its VMs access from a shared storage device (e.g., a networked storage array). When the host system detects a VM read request for data that is already available in the flash cache, the host system retrieves the data directly from the local flash storage device rather than performing a roundtrip to/from the shared storage device, thereby improving VM read performance.

One aspect of managing a host-side flash cache involves determining how to handle VM write requests. Some HFC implementations employ a write-through approach in which the host system saves data for a write request synchronously in both the local flash storage device and the shared storage device. Once the data is committed in both locations, the host system returns an acknowledgment to the originating VM indicating write completion. This approach ensures data consistency and durability in the face of host system crashes, but does not leverage the speed/locality of the flash storage device to improve VM write performance.

Other HFC implementations employ a write-back approach in which the host system initially saves data for a write request solely in the local flash storage device; the host system does not perform a synchronous save in the shared storage device. Once the data is committed in the local flash storage device, the host system immediately returns an acknowledgement to the originating VM. At a later point in time, the host system flushes the data (considered "dirty data") from the local flash storage device to the shared storage device, thereby completing the actual write process. This approach offers significantly lower VM write latency that write-through flash caching since the VM can proceed with its processing as soon as the host system completes its save in the local flash storage device. However, write-back flash caching may result in data corruption and/or data loss in the shared storage device if, e.g., the host system unexpectedly fails before all of the dirty data in the flash cache can be flushed.

To address some of the issues with write-back flash caching, it is possible to implement a RAID (Redundant Array of Inexpensive Disks) mirroring scheme such as RAID 1 in software. Such a scheme replicates the contents of the flash cache on one host system (i.e., the "primary" host system) to another host system (i.e., the "secondary" host system). Since the secondary host system maintains a backup copy of the flash cache, the likelihood of data corruption and/or data loss when the primary host system fails can be reduced or eliminated.

However, implementing RAID for write-back flash cache replication has its own inefficiencies and disadvantages. In particular, RAID generally requires that the primary host system perform the following sequential steps upon receiving a VM write request: (1) the primary host system saves the data for a VM write request in its local flash storage device; (2) the primary host system transmits the data to the secondary host system for replication; (3) the second host system saves a copy of the data in its local flash storage device and transmits a write completion message to the primary system; (4) the primary host system confirms that the data has been committed on the secondary host-side by receiving the write completion message transmitted at step (4); and (5) the primary host system returns an acknowledgement to the VM that originated the write request. Thus, the total latency for processing the write request (from the perspective of the VM) is the sum of the I/O latency for saving the data in the primary host-side flash storage device, the I/O latency for saving the data in the secondary host-side flash storage device, and the network latency for at least one roundtrip between the primary host system and the secondary host system. Although steps (1) and (2) can be done in parallel if 2 phase commit is used, steps (2) through (4) typically take at least an order of magnitude longer than step (1) when flash storage devices are used and an extra network roundtrip will be needed if 2-phase commit is used.

Contrast the above with a write-through implementation in which the shared storage device is an enterprise-class storage array. In this case, the host system saves the data for a VM write request synchronously in both its local flash storage device and the enterprise-class storage array. As part of the latter step, the enterprise-class storage array will typically perform storage-level caching to eliminate any disk I/O latency (by, e.g., caching the write data in NVRAM or a storage-side solid-state disk (SSD)) and immediately return a write completion message to the host system. Upon receiving the write completion message from the storage array (and verifying completion of the save to the local flash storage device), the host system returns an acknowledgement to the originating VM. Thus, the total latency for processing the write request in this scenario is the sum of the I/O latency for saving the data in the local flash storage device and the network latency for one round trip between the host system and the storage array, which is potentially less than the total write latency in the "write-back+RAID" scenario. This means that combining write-back flash caching with software RAID mirroring may not provide any better performance (and in some situations, may provide worse performance) than write-through flash caching with enterprise-class storage.

SUMMARY

Techniques for replicating a write-back cache are provided. In one embodiment, a first computer system can receive a write request from a VM that includes data to be written to a shared storage device. The first computer system can further save the data in a local cache device and transmit, via a network interface controller (NIC), a data packet including the data to a second computer system. Upon determining that the data packet has been transmitted via the NIC, the first computer system can communicate an acknowledgment to the VM indicating that the write request has been successfully processed.

The following detailed description and accompanying drawings provide a better understanding of the nature and advantages of particular embodiments.

DETAILED DESCRIPTION

Figure 1:
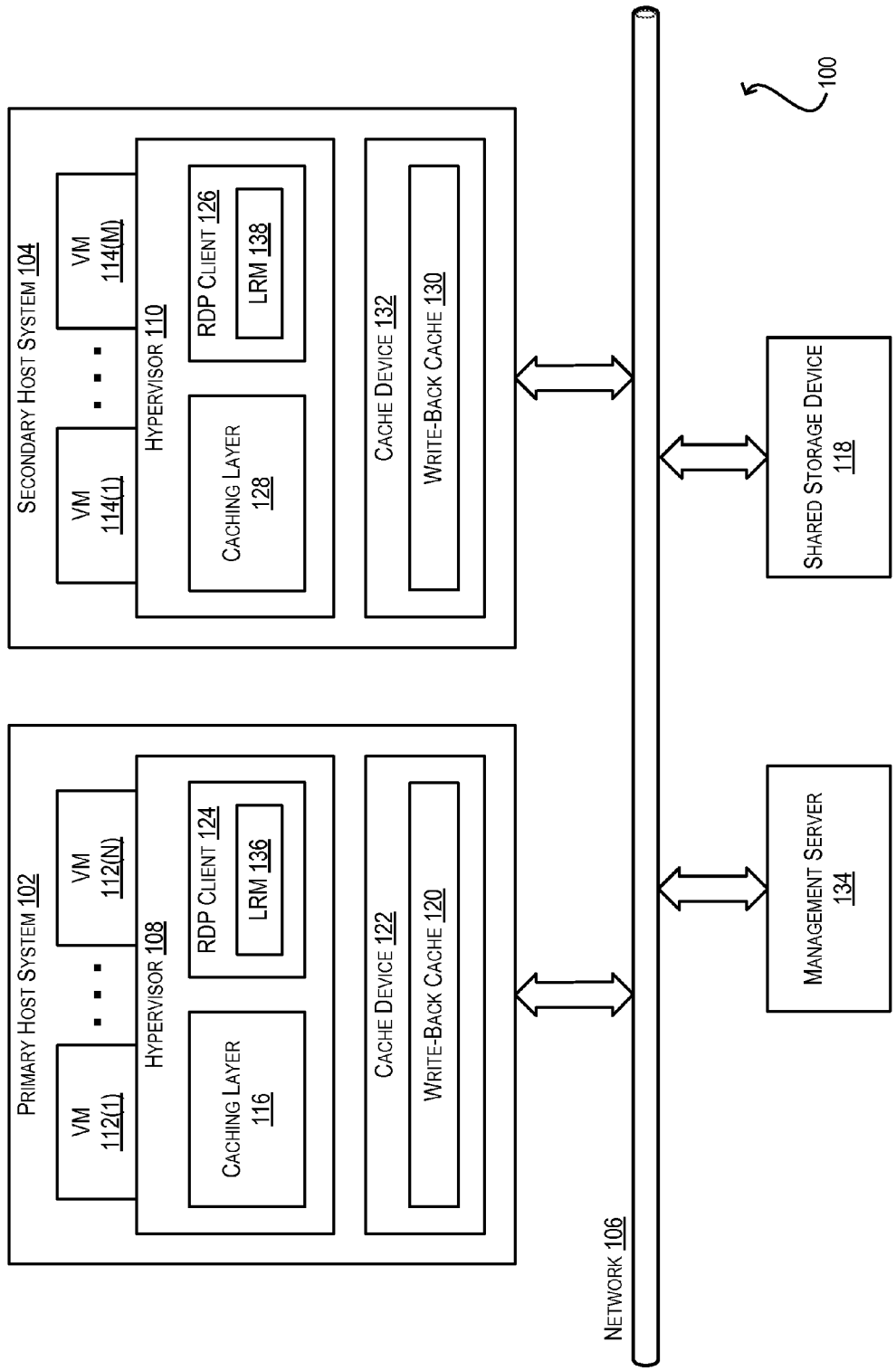
FIG. 1 depicts a system environment according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques for efficiently replicating data in a write-back cache (i.e., a cache that is managed using a write-back approach) from a primary host system to a secondary host system. In one embodiment, the primary host system can intercept a VM write request that includes data destined for a shared storage device (e.g., a networked storage array) and can save the data in a local write-back cache (e.g., a flash cache in a local flash storage device). The primary host system can further transmit, via a NIC, one or more data packets including the data to the secondary host system, thereby enabling the secondary host system to replicate the data in its own local write-back cache. Upon determining that the NIC has sent out the one or more data packets "over the wire" to the secondary host system, the primary host system can communicate an acknowledgement to the VM that originated the write request indicating that the request has been successfully processed.

With the approach above, the performance loss associated with replicating a write-back cache using RAID (or other similar mirroring schemes) can be minimized or avoided. In particular, since the primary host system can communicate the write acknowledgement to the originating VM immediately upon determining that wire transmission of the data packet is complete, the VM can continue with its processing without waiting for a network roundtrip between the primary host system and the secondary host system. As a result, the write performance of the VM can be very close to the performance achievable via single host write-back caching without replication, and can be significantly greater than the performance achievable via write-through caching (even when using enterprise-class storage).

It should be noted that the foregoing approach does not guarantee that all of the data in the write-back cache of the primary host system will be available in the write-back cache of the secondary host system in the event of a primary host crash; for example, in some cases, the secondary host system may drop data packets transmitted by the primary host system, resulting in a small amount of data loss. However, the primary and secondary host systems can implement measures to ensure that such data loss is detected and handled in a way that avoids data corruption in the shared storage device. For example, in one embodiment, the primary host system can transmit the data packets using an ordered network protocol (e.g., Reliable Datagram Protocol (RDP)) and can include, in each data packet, a monotonically-increasing sequence number. As described in further detail below, the secondary host system can use this sequence number to identify "gaps" in the write data received from the primary host system and implement appropriate processing to avoid data corruption due to such gaps.

FIG. 1 depicts a system environment 100 that supports write-back cache replication according to an embodiment. As shown, system environment 100 includes a primary host system 102 and a secondary host system 104 that are communicatively coupled via a network 106 (e.g., an IP fabric). Each host system 102, 104 includes a hypervisor (108, 110) that provides an environment in which one or more VMs (112(1)-112(N), 114(1)-114(M)) can run. In one embodiment, each hypervisor 108, 110 can interact directly with the hardware platform of its corresponding host system without an intervening host operating system. In this embodiment, the hypervisor can include a kernel (not shown) that manages VM use of the various hardware devices of the host system. In an alternative embodiment, each hypervisor 108, 110 can be part of a "hosted" configuration in which the hypervisor runs on top of a host operating system (not shown). In this embodiment, the hypervisor can rely on the host operating system for physical resource management of hardware devices. One of ordinary skill in the art will recognize various modifications and alternatives for the design and configuration of hypervisors 108 and 110.

At runtime, hypervisor 108 of primary host system 102 can intercept, via a caching layer 116, write requests from VMs 112(1)-112(N) that are destined for a shared storage device 118 (e.g., a networked storage array). For simplicity, shared storage device 118 is shown as being connected to the same network 106 that interconnects host systems 102 and 104, but in alternative embodiments shared storage device 118 can communicate with host systems 102 and 104 via a dedicated storage network (e.g., a fibre channel-based SAN). Upon intercepting the write requests, caching layer 116 can employ a write-back policy for caching the data associated with the write requests (i.e., the "write data") in a write-back cache 120 resident on a local cache device 122. Cache device 122 can be, e.g., a flash storage device (such as an SSD, PCI-e flash card, etc.), a volatile memory device (such as RAM), or any other type of local storage component. The write-back policy means that caching layer 116 does not need to perform a synchronous save of the write data to shared storage device 118 at the time of populating write-back cache 120; instead, caching layer 116 can flush the write data from write-back cache 120 to shared storage device 118 at a later point in time. For purposes of this disclosure, it is assumed that caching layer 116 performs this asynchronous flushing in a manner that preserves the original order of the write requests generated by VMs 112(1)-112(N) (thereby avoiding data corruption caused by out-of-order writes).

Concurrently with the caching described above, hypervisor 108 of primary host system 102 can also execute a flow for replicating the contents of write-back cache 120 to secondary host system 104. In particular, a Remote Datagram Protocol (RDP) client 124 of hypervisor 108 can receive, from caching layer 116, write data that has been (or will be) cached in write-back cache 120 and can transmit the write data (in the form of one or more RDP data packets) over network 106 to secondary host system 104. On the secondary host side, a RDP client 126 within hypervisor 110 can receive the data packets transmitted by RDP client 124 of primary host system 102 and extract the write data. RDP client 126 can then cause the write data to be propagated through a caching layer 128 and saved in a write-back cache 130 resident on a secondary host-side cache device 132, thereby replicating the write data on secondary host system 104.

At times when primary host system 102 needs to flush its write-back cache 120 to shared storage device 118, RDP client 124 of primary host system 102 can transmit another RDP data packet to secondary host system 104 with information identifying the flushed data. RDP client 126/caching layer 128 of secondary host system 104 can use this information to delete the flushed data from write-back cache 130 and thus keep write-back cache 130 in sync with write-back cache 120.

Since the foregoing replication flow essentially creates a redundant backup of write-back cache 120 on secondary host system 104, secondary host system 104 can take over the duties of primary host system 102 in the event of a system failure. For example, assume primary host system 102 unexpectedly crashes. In response, a management server 134 of system environment 100 can detect the crash and notify secondary host system 104. Secondary host system 104 can then take appropriate steps to ensure that the unflushed write data in write-back cache 120 of primary host system 102 (which is replicated in write-back cache 130 of secondary host system 104) can still be accessed. For instance, in one embodiment, secondary host system 104 can flush its write-back cache 130 to shared storage device 118 so that the write data can be accessed by any other host system connected to network 106. In another embodiment, secondary host system 104 can take over execution of the VMs previously running on primary host system 102 (e.g., 112(1)-112(N)) and service VM I/O requests directly from its write-back cache 130. In this case, management server 134 can provision a third host system (not shown) to act as the new mirror for secondary host system 104 and can initiate a process for replicating the unflushed data in write-back cache 130 to the local cache device of the third host system.

As noted in the Background section, one issue with combining write-back caching with cache replication via RAID or other similar mirroring schemes is that the primary host system must wait for a write completion message from the secondary host system before returning a write acknowledgement back to an originating VM. This means that the write latency experienced by the VM is increased (beyond the single host write-back caching scenario) to include the network latency needed to complete one or more commonly two roundtrips between the two host systems, as well as the I/O latency needed to commit the write data in the secondary host-side cache device. This added latency can nullify the performance benefits of write-back caching, to the point where write-through caching with certain types of backend storage devices (e.g., enterprise-class storage arrays) may actually perform better.

To address this performance problem, hypervisors 108 and 110 of FIG. 1 can include lightweight replication modules (LRMs) 136 and 138 respectively. Although LRMs 136 and 138 are shown as being part of RDP clients 130 and 132, in alternative embodiments LRMs 136 and 138 can be distinct modules running within (or on top of) hypervisors 108 and 110. As described in further detail below, LRMs 136 and 138 can interact with each other (and with other components of host systems 102 and 104) in a way that allows primary host system 102 to return write acknowledgments to VMs 112(1)-112(N), without first waiting for a write completion message from secondary host system 104.

Figure 2:
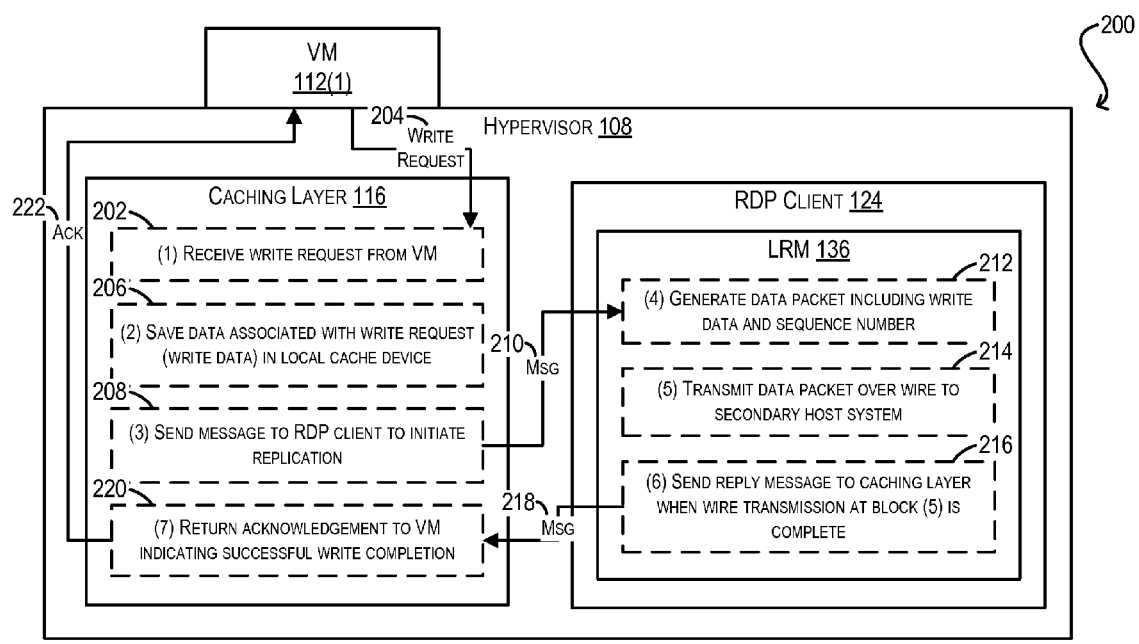
FIG. 2 depicts a flow performed by a primary host system for performing write-back cache replication according to an embodiment.

FIG. 2 depicts a high-level flow 200 that can be carried out by caching layer 116 and LRM 136/RDP client 124 of primary host system 102 for caching/replicating a VM write request according to an embodiment. At step (1) (reference numeral 202), caching layer 116 can receive a write request (204) from a particular VM (e.g., VM 112(1)). At step (2) (reference numeral 206), caching layer 116 can save the data associated with the write request (i.e., the "write data") in write-back cache 120 of local cache device 122. After (or concurrently with) step (2), caching layer 116 can send a message (210) to RDP client 124/LRM 136 to initiate replication of the write data (step (3), reference numeral 208).

Upon receiving message 210, LRM 136 can generate a data packet that includes the write data and a sequence number (step (4), reference numeral 212). In one embodiment, the data packet can conform to RDP, which is an ordered network protocol. Further, the sequence number can be a monotonically-increasing number that identifies a unique write order for the current write request. LRM 136 can then cause the data packet to transmitted "over the wire" (e.g., over network 106 via an outgoing NIC port) to secondary host system 104 (step (5), reference numeral 214). When LRM 136 determines that the data packet has been sent out by the NIC (but not necessarily received by secondary host system 104), LRM 136 can send a reply message (218) to caching layer 116 indicating transmission completion (step (6), reference numeral 216).

Finally, at step (7) (reference numeral 220), caching layer 116 can receive reply message 218 from LRM 136 and return an acknowledgement to VM 112(1) indicating that the write request has been successfully processed/completed.

Figure 3:
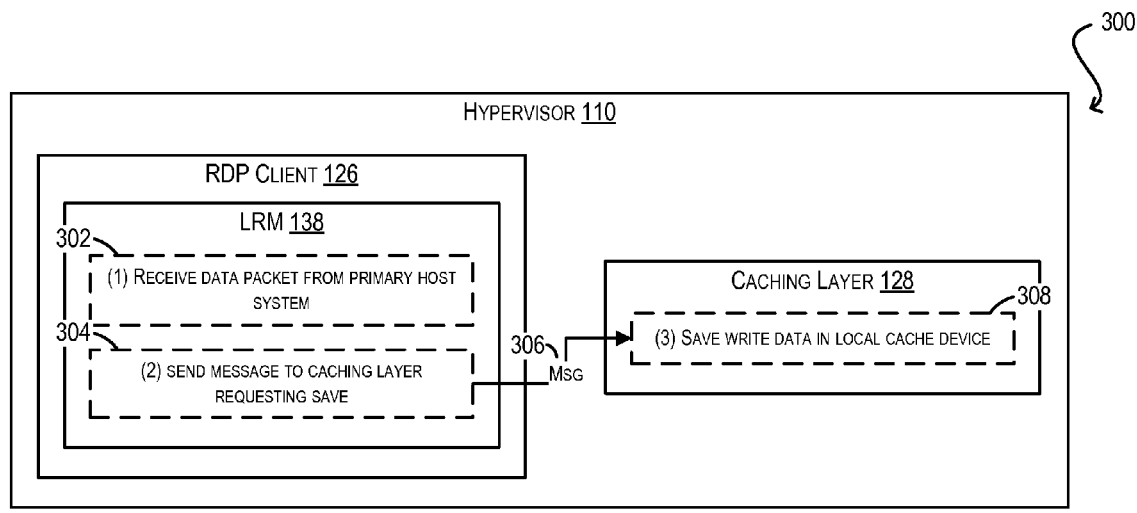
FIG. 3 depicts a flow performed by a secondary host system for performing write-back cache replication according to an embodiment.

FIG. 3 depicts a high-level flow 300 that can be carried out by LRM 138/RDP client 126 and caching layer 128 of secondary host system 104 upon receiving the data packet sent out by primary host system 102 at step (5) of flow 200 according to an embodiment. At steps (1) and (2) of flow 300 (reference numerals 302 and 304), LRM 138 of RDP client 126 can receive the data packet and can send a message (306) to caching layer 128 requesting that the write data in the packet be locally cached. In certain embodiments, as part of step (2), LRM 138 can analyze the sequence number included in the data packet and determine whether the sequence number is "correct" (i.e., corresponds to the next expected sequence number from primary host system 102). In this way, LRM 138 can know whether there is a gap in the set of writes received from primary host system 102 that could potentially lead to data corruption in the event of a failover from primary host system 102 to secondary host system 104. If such a gap is found, LRM 138 and/or caching layer 128 can implement any one of a number of techniques to avoid or minimize the likelihood of data corruption (for example, FIGS. 5A and 5B below describe a technique for buffering data packets that are not received in write order).

Finally at step (3) (reference numeral 308), caching layer 128 can receive message 306 from LRM 138 and save the write data in write-back cache 130 of local cache device 132, thereby replicating the write on secondary host system 104.

With the approach shown in FIGS. 2 and 3, the performance overhead for write-back cache replication is significantly reduced since caching layer 116 of primary host system 102 can return write acknowledgments to VMs 112(1)-112(N) as soon as the write data leaves primary host system 102 (and before it reaches secondary host system 104). As a result, the write latency experienced by VMs 112(1)-112(N) can be comparable to single host write-back caching without replication. Further, although this approach may be susceptible to some data loss (if, e.g., one or more of the data packets transmitted by primary host system 102 are lost/dropped), any such data loss can be reliably detected via the sequence numbers noted above and thus handled by secondary host system 104 to avoid data corruption in shared storage device 118.

Figure 4A:
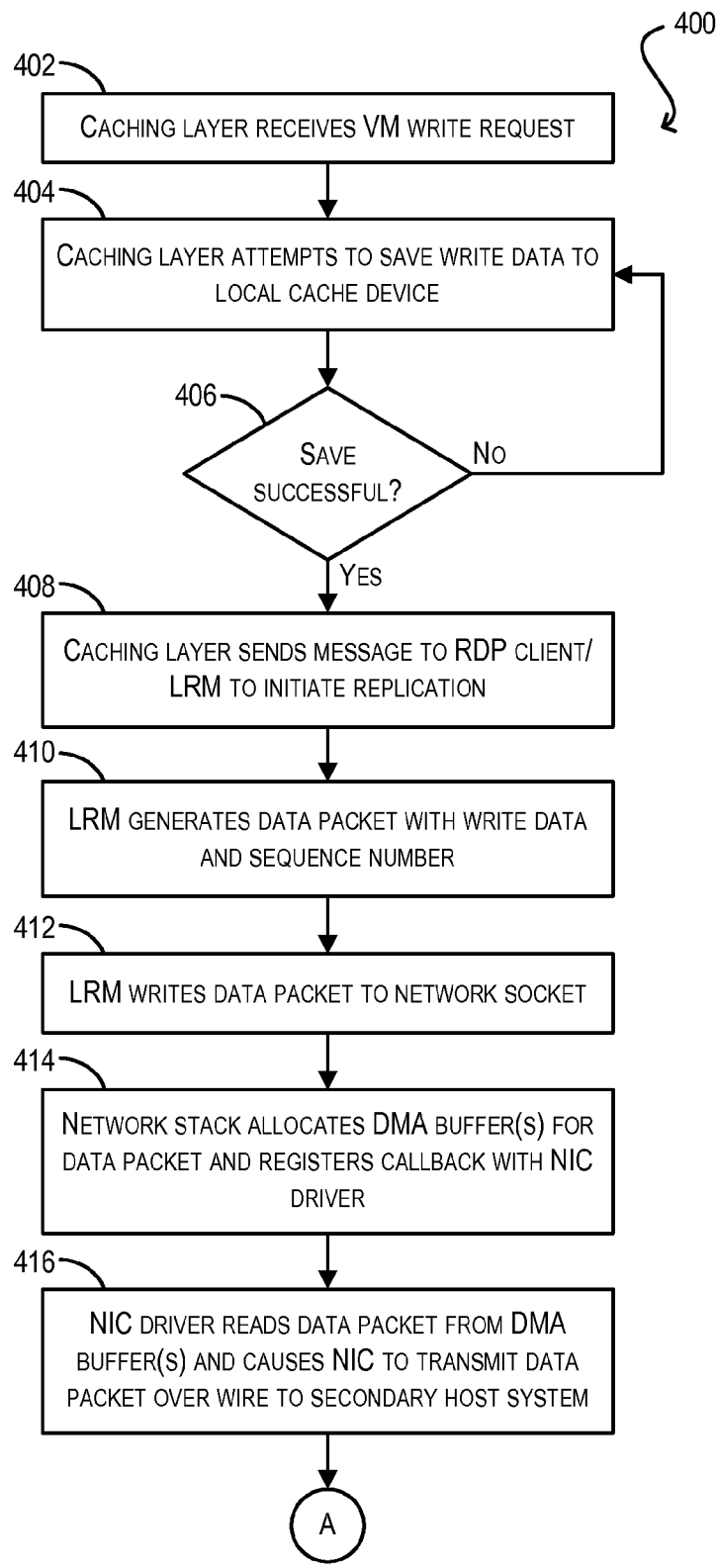
FIGS. 4A and 4B depict a flow chart that provides additional details regarding the flow of FIG. 2 according to an embodiment.
Figure 4B:
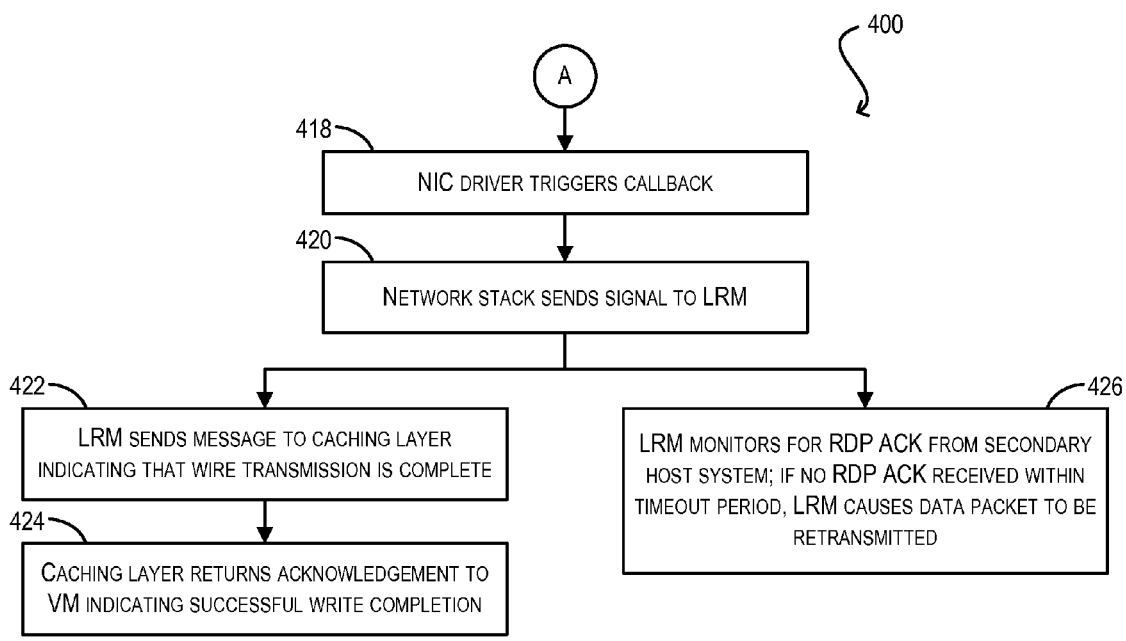

FIGS. 4A and 4B depict a flowchart 400 that provides additional details regarding the processing that primary host system 102 may perform to cache/replicate a VM write request (per flow 200 of FIG. 2) according to an embodiment. At block 402, caching layer 116 can receive a VM write request from, e.g., VM 112(1). At block 404, caching layer 116 can attempt to save the write data for the request in local write-back cache 120. If caching layer 116 determines that the local save is unsuccessful (block 406), caching layer 116 can retry block 404 until it is successful (or until a preconfigured number of retry attempts is reached).

If caching layer 116 determines that the local save is successful, caching layer 116 can send a message to RDP client 124/LRM 136 to initiate replication of the write data (block 408). In response, LRM 136 can generate a data packet (e.g., an RDP packet) that includes the write data and a sequence number (block 410). As noted previously, the sequence number can be, e.g., a monotonically-increasing number that represents a write order for the write request (relative to other write requests originating from VMs 112(1)-112(N)). LRM 136 can then interact with the network stack of hypervisor 108 via a series of steps (blocks 412-420) to transmit the data packet over the wire to secondary host system 104.

In particular, at block 412, LRM 136 can write the data packet to a network socket (e.g., a TCP/IP socket) that is connected to secondary host system 104. At block 414, the network stack of hypervisor 108 can allocate one or more direct memory access (DMA) buffers for the data packet, write the data packet to the buffers, and register a callback with a NIC driver. The NIC driver can then read the data packet from the DMA buffers and cause its associated NIC to transmit the data packet over the wire to secondary host system 104 (block 416).

Turning now to FIG. 4B, at block 418 the NIC driver triggers the callback that the network stack registered at block 414. In response, the network stack can determine that the data packet has been sent out and may choose to free the allocated DMA buffers (block 420) if, for example, the socket is UDP which does not automatically retransmit unacknowledged packets. As part of this step and regardless of whether the socket is UDP, TCP or something else, the network stack can also send a signal to LRM 136.

Upon receiving the signal from the network stack, LRM 136 can send a message to caching layer 116 indicating that wire transmission of the data packet is complete (block 422). This message can correspond to message 218 in FIG. 2. Caching layer 116 can thereafter return an acknowledgement to VM 112(1) indicating successful write completion (block 424).

In certain embodiments, concurrently with blocks 422 and 424, LRM 136 can also enter a "retransmission" loop in order to ensure that the data packet sent over the wire at block 416 is reliably received by secondary host system 104. For example, at block 426, LRM 136 can monitor for a delivery confirmation control packet (e.g., an RDP ACK) from secondary host system 104. If LRM 136 does not detect such a control packet within a preconfigured timeout period, LRM 136 can retransmit the original data packet to secondary host system 104. This process can continue until, e.g., the delivery confirmation control packet is received or until a preconfigured number of retransmission attempts is reached.

Figure 5A:
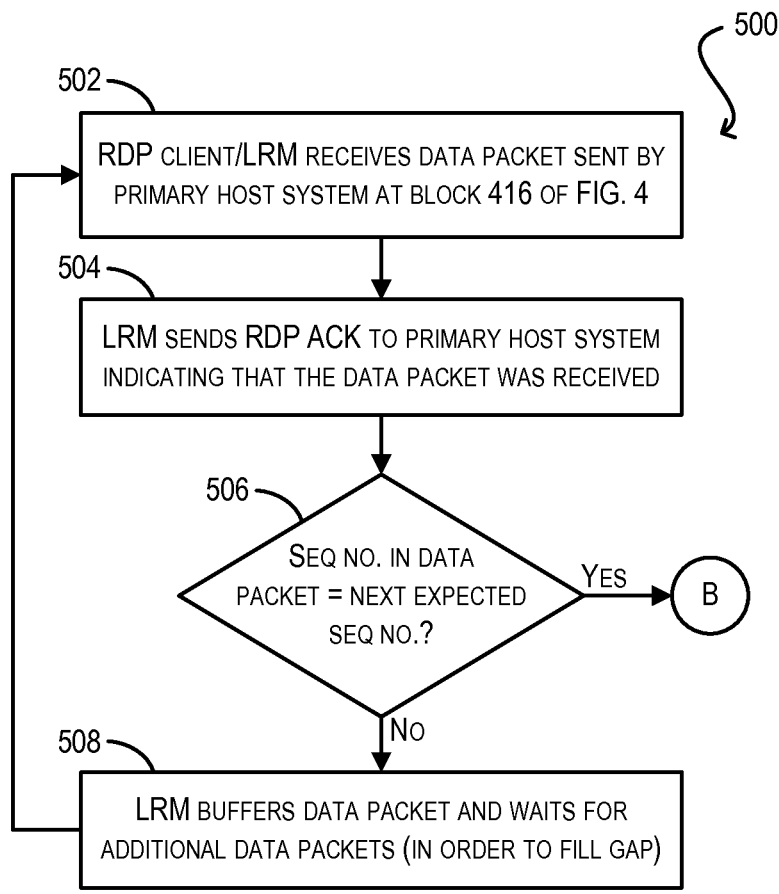
FIGS. 5A and 5B depict a flow chart that provides additional details regarding the flow of FIG. 3 according to an embodiment.
Figure 5B:
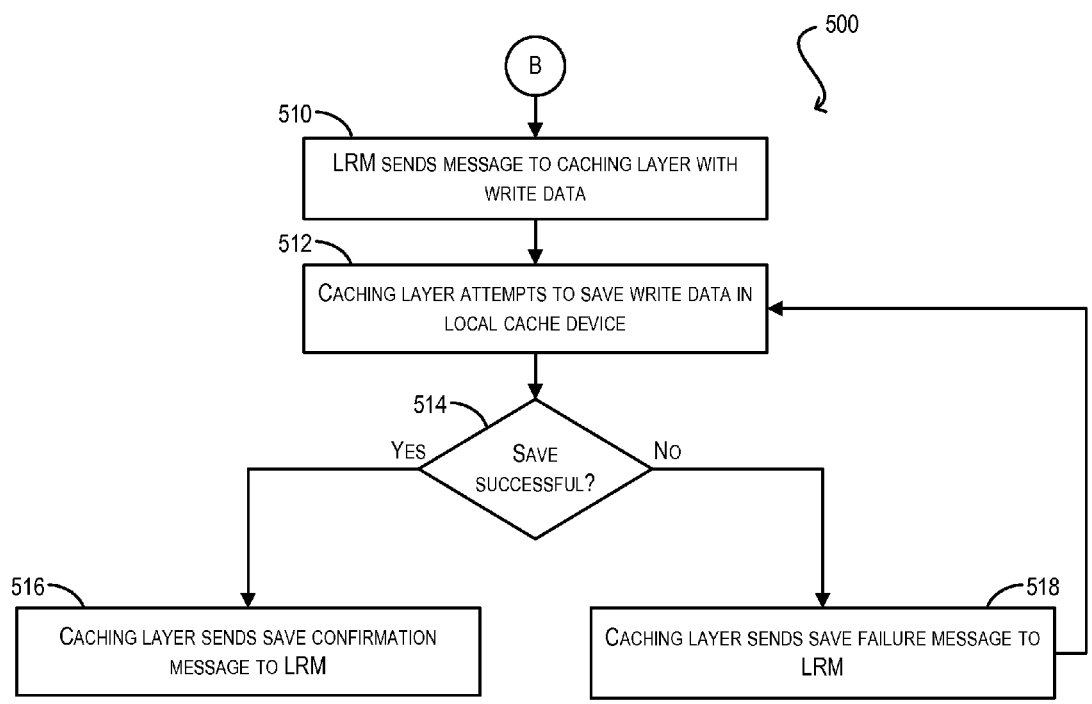

FIGS. 5A and 5B depict a flowchart 500 that provides additional details regarding the processing that secondary host system 104 may perform for replicating write data received from primary host system 102 (per flow 300 of FIG. 3) according to an embodiment. In one embodiment, secondary host system 104 can execute flowchart 500 while primary host system 102 is executing flowchart 400 of FIG. 4.

At block 502, RDP client 126/LRM 138 of secondary host system 104 can receive the data packet transmitted by primary host system 102 at block 416 of FIG. 4. In response, LRM 138 can send a delivery confirmation control packet (e.g., an RDP ACK) to primary host system 102 indicating that the data packet was received (block 504). LRM 138 can also check the sequence number included in the data packet (block 506). If the sequence number is not equal to the next expected sequence number from primary host system 102, LRM 138 can determine that there is a gap in the write data being received. As a result, LRM 138 can buffer the current data packet and return to block 502 in order to wait for additional data packets from primary host system 102 (block 508). In this manner, LRM 138 can delay saving the write data into write-back cache 130 until all of the write requests with earlier sequence numbers have been received and committed.

If the sequence number in the received data packet is equal to the next expected sequence number, flowchart 500 can continue to FIG. 5B. At block 510, LRM 138 can send a message to caching layer 128 with the write data for the write request (e.g., message 306 of FIG. 3). Caching layer 128 can then attempt to save the write data in write-back cache 130 of local cache device 132.

If the save is successful (block 514), caching layer 128 can send a save confirmation message to LRM 138 (block 516). On the other hand, if the save is unsuccessful, caching layer 128 can send a save failure message to LRM 138 (block 518). In response to the save failure message, LRM 138 can attempt to retry the save until it is successful (or until a preconfigured number of retry attempts is reached).

With the process shown in FIGS. 5A and 5B, secondary host system 104 can ensure that the data in write-back cache 130 is never corrupted due to lost/dropped data packets from primary host system 102 (via the buffering mechanism of block 508), and that write data is reliably saved to cache 130 (via the retry mechanism of blocks 512-518). In some embodiments, rather that implementing the buffering mechanism of block 508, secondary host system 104 can implement alternative techniques for handling data loss (and thereby preventing data corruption). For example, in one embodiment, LRM 138 can pass all writes through to caching layer 128 for saving in write-back cache 130 (regardless of whether there are gaps in the sequence numbers), but can keep track of any unresolved gaps. If a failover occurs from primary host system 102 to secondary host system 104 at a time when unresolved gaps still exist, LRM 138 can send a message to a higher-level control application indicating that the data in write-back cache 130 is corrupt and should not be flushed to shared storage device 118. In this way, LRM 138 can prevent shared storage device 118 from also becoming corrupted.

In another embodiment, LRM 138 can pass all writes through to caching layer 128 along with their associated sequence numbers. Caching layer 128 can then execute appropriate logic for ensuring that the writes are saved in order based on the sequence number. In this embodiment, the sequence numbers can be stored with the write data (via a metadata tag) in write-back cache 130.

Figure 6:
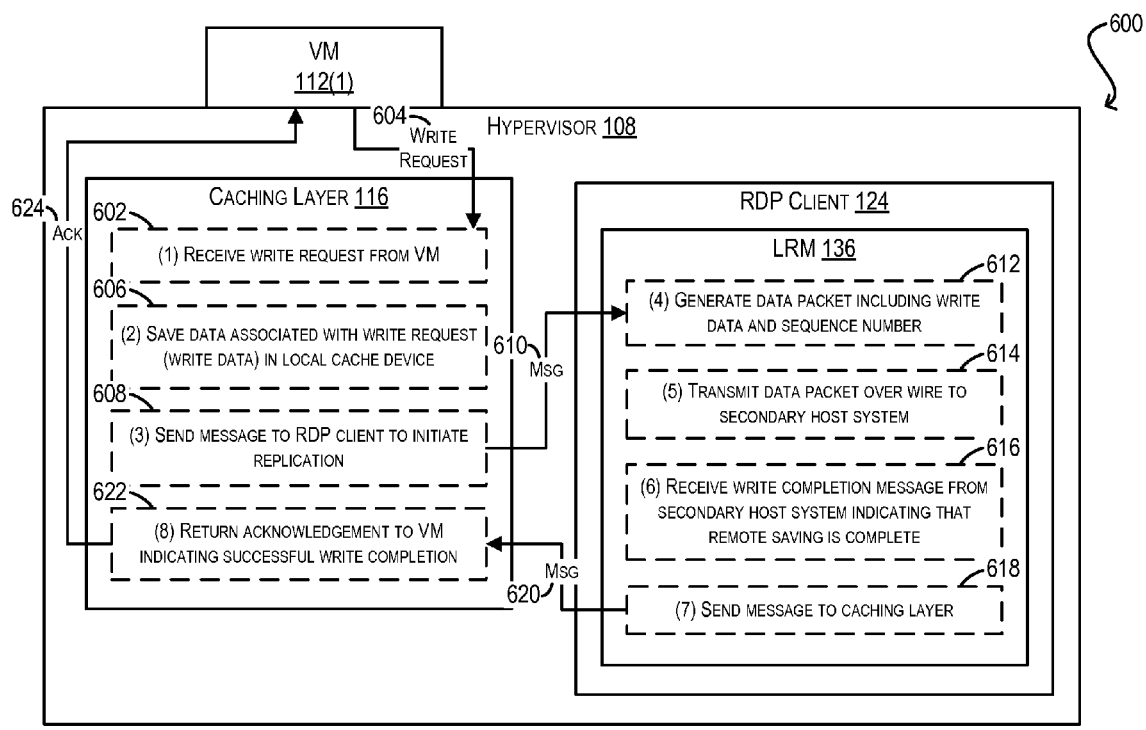
FIGS. 6 and 7 depict an alternative approach for performing write-back cache replication according to an embodiment.
Figure 7:
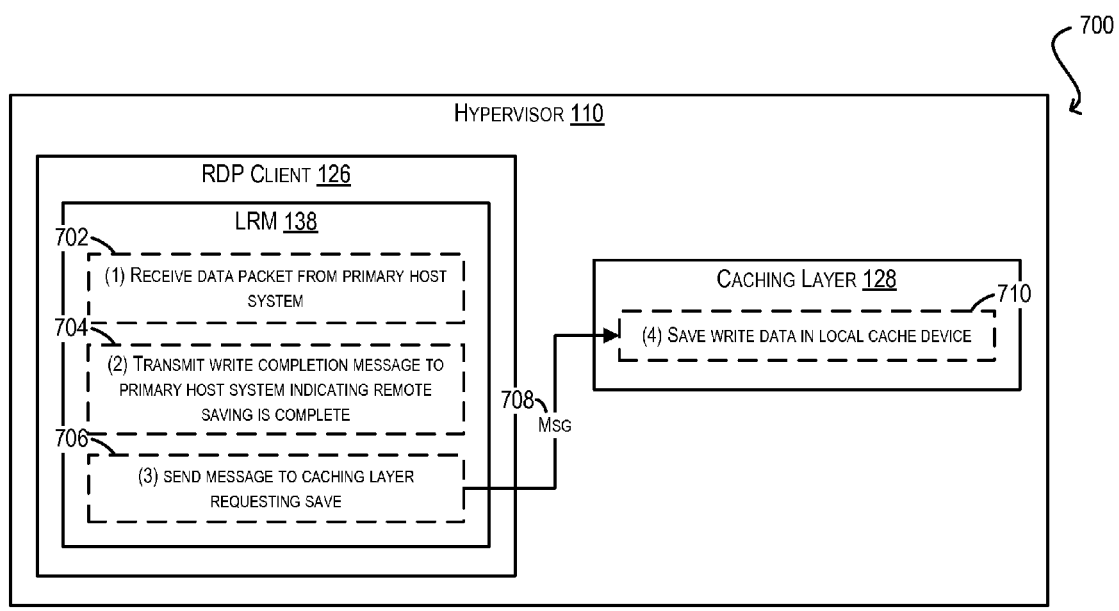

The embodiments described above with respect to FIGS. 2, 3, 4A, 4B, 5A, and 5B are all similar in that they allow primary host system 102 to acknowledge write requests to VMs 112(1)-112(N) as soon as the write data for the requests are transmitted over the wire to secondary host system 104. FIGS. 6 and 7 depicts flows 600 and 700 for an alternative approach in which primary host system 102 waits for a write completion message from secondary host system 104 before acknowledging a write request to its originating VM, but secondary host system 104 can send out the write completion message as soon as it receives the write data from primary host system 102 (without first confirming that the write data has been successfully saved in write-back cache 130). Although this approach is not quite as efficient as acknowledging upon wire transmission, this approach still provides benefits because the originating VM does not need to wait for the write data to be physically saved into the secondary host-side cache and it requires only a single network roundtrip rather than the two required for two-phase commit.

Starting with reference to FIG. 6, flow 600 illustrates steps performed by primary host system 102 upon receiving a VM write request. Steps (1)-(5) (reference numerals 602-614) are substantially similar to steps (1)-(5) of flow 200 (e.g., caching layer 116 saves write data to local write-back cache 120, RDP client 124/LRM 136 sends a data packet including the write data and a sequence number to secondary host system 104).

At step (6) of flow 600 (reference numeral 616), LRM 136 of primary host system 102 can wait for and receive a write completion message from secondary host system 104 indicating that remote saving of the write data is complete. In response, LRM 136 can send a message (620) to caching layer 116 indicating the same (step (7), reference numeral 618), and caching layer can thereafter return a write acknowledgement (624) to originating VM 112(1) (step (8), reference numeral 622).

Turning now to FIG. 7, flow 700 illustrates steps performed by secondary host system 104 upon receiving the data packet sent by primary host system 102 at step (5) of flow 600. At steps (1) and (2) (reference numerals 702 and 704), RDP client 126/LRM 138 can receive the data packet and immediately transmit a write completion message to primary host system 102 indicating that remote saving of the write data is complete. In one embodiment, RDP client 126/LRM 138 can piggyback the write completion message on an RDP ACK control packet that is sent to primary host system 102 in order to acknowledge the receipt of the original data packet (as in block 504 of FIG. 5A). In other embodiments, RDP client 126/LRM 138 can transmit the write completion message to primary host system 102 as a separate datagram. Note that secondary host system 104 has not actually committed the write data in write-back cache 130 at this point.

After transmitting the write completion message, LRM 138 can send a message (708) to caching layer 128 requesting that the write data in the data packet be saved (step (3), reference numeral 706). Caching layer 128 can then save the write data in write-back cache 130 (step (4), reference numeral 710). Further, although not shown, LRM 138 can execute a retry mechanism concurrently with blocks 706 and 710 (similar to blocks 512-518 of FIG. 5B) in order to ensure that the write data is successfully committed in write-back cache 130.

In some embodiments, primary host system 102/secondary host system 104 can each implement both the "acknowledge upon wire transmission" approach of FIGS. 2, 3 and the "acknowledge upon confirmation of write completion" approach of FIGS. 6, 7. In these embodiments, the particular acknowledgement approach that systems 102 and 104 use at a given time may be configured via management server 134.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for replicating a write-back cache, the method comprising:

receiving, by a first computer system, a write request from a virtual machine (VM) that includes data to be written to a shared storage device;

saving, by the first computer system, the data in a cache device local to the first computer system;

transmitting, by the first computer system via a network interface controller (NIC), a data packet including the data to a second computer system;

verifying, by the first computer system, that the data packet has been transmitted via the NIC; and in response to the verifying, communicating, by the first computer system, an acknowledgment to the VM indicating that the write request has been successfully processed, without waiting for an acknowledgement message from the second computer system.

2. The method of claim 1 wherein the method further comprises, after the communicating:

monitoring, by the first computer system, for a confirmation message from the second computer system indicating that the data packet has been successfully received; and if no such confirmation is received from the second computer system after a predetermined time interval, retransmitting the data packet to the second computer system.

3. The method of claim 1 wherein transmitting the data packet comprises allocating one or more direct memory access (DMA) buffers accessible by the NIC and writing the data to the one or more DMA buffers; and wherein verifying that the data packet has been transmitted comprises receiving a signal from the NIC that the one or more DMA buffers are no longer needed.

4. The method of claim 1 wherein the data packet further includes a sequence number indicating a write order for the data.

5. The method of claim 4 wherein, upon receiving the data packet, the second computer system is configured to:

compare the sequence number included in the data packet against a previous sequence number received via a previous data packet from the first computer system;

if there is no gap between the sequence number and the previous sequence number, commit the data in a cache device local to the second computer system; and if there is a gap between the sequence number and the previous sequence number, buffer the data until one or more further data packets are received from the first computer system.

6. The method of claim 5 wherein if the commit fails, the second computer system is further configured to retry the commit until it is successful.

7. A non-transitory computer readable storage medium having stored thereon software executable by a computer system, the software embodying a method for replicating a write-back cache, the method comprising:

receiving a write request from a VM that includes data to be written to a shared storage device;

saving the data in a cache device local to the computer system;

transmitting, via a NIC, a data packet including the data to another computer system;

verifying that the data packet has been transmitted via the NIC; and in response to the verifying, communicating an acknowledgment to the VM indicating that the write request has been successfully processed, without waiting for an acknowledgement message from said another computer system.

8. The non-transitory computer readable storage medium of claim 7 wherein the method further comprises, after the communicating:

monitoring for a confirmation message from said another computer system indicating that the data packet has been successfully received; and if no such confirmation is received from said another computer system after a predetermined time interval, retransmitting the data packet to said another computer system.

9. The non-transitory computer readable storage medium of claim 7 wherein transmitting the data packet comprises allocating one or more direct memory access (DMA) buffers accessible by the NIC and writing the data to the one or more DMA buffers; and wherein verifying that the data packet has been transmitted comprises receiving a signal from the NIC that the one or more DMA buffers are no longer needed.

10. The non-transitory computer readable storage medium of claim 7 wherein the data packet further includes a sequence number indicating a write order for the data.

11. The non-transitory computer readable storage medium of claim 10 wherein, upon receiving the data packet, said another computer system is configured to:

compare the sequence number included in the data packet against a previous sequence number received via a previous data packet from the computer system;

if there is no gap between the sequence number and the previous sequence number, commit the data in a cache device local to said another computer system; and if there is a gap between the sequence number and the previous sequence number, buffer the data until one or more further data packets are received from the computer system.

12. The non-transitory computer readable storage medium of claim 11 wherein if the commit fails, said another computer system is further configured to retry the commit until it is successful.

13. A computer system comprising:

a processor; and a non-transitory data store having stored thereon program code which, when executed by processor, causes the processor to:

receive a write request from a VM that includes data to be written to a shared storage device;

save the data in a cache device local to the computer system;

transmit, via a NIC, a data packet including the data to another computer system;

verify that the data packet has been transmitted via the NIC; and in response to the verifying, communicate an acknowledgment to the VM indicating that the write request has been successfully processed, without waiting for an acknowledgement message from said another computer system.

14. The computer system of claim 13 wherein the non-transitory data store has stored thereon further program code that causes the processor to, after the communicating:

monitor for a confirmation message from said another computer system indicating that the data packet has been successfully received; and if no such confirmation is received from said another computer system after a predetermined time interval, retransmit the data packet to said another computer system.

15. The computer system of claim 13 wherein the program code that causes the processor to transmit the data packet further comprises program code that causes the processor to allocate one or more direct memory access (DMA) buffers accessible by the NIC and write the data to the one or more DMA buffers; and wherein the program code that causes the processor to verify that the data packet has been transmitted comprises program code that causes the processor to receive a signal from the NIC that the one or more DMA buffers are no longer needed.

16. The computer system of claim 13 wherein the data packet further includes a sequence number indicating a write order for the data.

17. The computer system of claim 16 wherein, upon receiving the data packet, said another computer system is configured to:

compare the sequence number included in the data packet against a previous sequence number received via a previous data packet from the computer system;

if there is no gap between the sequence number and the previous sequence number, commit the data in a cache device local to said another computer system; and if there is a gap between the sequence number and the previous sequence number, buffer the data until one or more further data packets are received from the computer system.

18. The computer system of claim 17 wherein if the commit fails, said another computer system is further configured to retry the commit until it is successful.

\* \* \* \* \*